United States Patent [19]

Eleouet et al.

[11] Patent Number: 4,957,810

[45] Date of Patent: Sep. 18, 1990

[54] SYNTHETIC SPONGE-TYPE ARTICLES HAVING EXCELLENT WATER RETENTION

[75] Inventors: Bernard Eleouet; Michel Ramage; Gilles Rongier, all of St. Paul, Minn.

[73] Assignee: Minnesota Mining and Manufacturing Company, St. Paul, Minn.

[21] Appl. No.: 342,176

[22] Filed: Apr. 24, 1989

[51] Int. Cl.$^5$ .............................................. B32B 3/26
[52] U.S. Cl. ................................ 428/306.6; 427/244; 428/308.4
[58] Field of Search ...................... 427/244; 428/306.6, 428/308.4

[56] References Cited

U.S. PATENT DOCUMENTS 4,555,313 11/1985 Duchane et al. .................... 427/244

Primary Examiner—William J. Van Balen
Attorney, Agent, or Firm—Donald M. Sell; Walter N. Kirn; Richard Francis

[57] ABSTRACT

Articles comprise a body made of hydrophobic synthetic partially open-cell material at least partially covered with a layer of hydrophilic material. The body of each article is characterized by the fact that it has a specific surface at least equal to about 40 cm$^2$/cm$^3$, and at least about 25% of its internal and external surface has a surface energy at least equal to about $73 \times 10^{-7}$ newton/meter. The articles find use as sponges, so-called suede type materials, and wiping clothes. The sponges may be used for wiping, cleaning and other household or industrial uses.

6 Claims, No Drawings

SYNTHETIC SPONGE-TYPE ARTICLES HAVING EXCELLENT WATER RETENTION

TECHNICAL FIELD

The present invention relates to sponge-type articles mainly used for wiping, cleaning, and other household and industrial uses.

BACKGROUND

Natural sponges have excellent water retention and physical, mechanical and chemical resistance qualities when used with normal household and industrial cleaning materials. Besides being somewhat scarce and expensive, natural sponges have irregular shapes and dimensions and thus are not selected for use in many commercial applications where standard shapes and dimensions are required.

One of the synthetic sponge-type materials made to replace natural sponge is regenerated cellulose. Regenerated cellulose can be commercially manufactured with desirable standardized shapes and dimensions. Synthetic cellulose sponges have sufficient water retention properties for common uses, but they also have a high production cost and inferior physical, mechanical and chemical resistance properties when they are used with common household maintenance products.

Less expensive sponge-type alternatives having better physical and chemical resistance have been developed. These include synthetic open celled foam sponges made of natural rubber or of a synthetic rubber polymer latex, principally from polyvinyl chloride, polyamide and polyurethane. These foams can be commercially manufactured at reasonable cost and have acceptable physical and chemical resistance, but they are generally hydrophobic and consequently have only a small water retention capacity, thus making them generally unacceptable for satisfactory wiping.

Such synthetic hydrophobic foam materials have been rendered hydrophilic by superficial coating of a hydrophilic substance such as clay. While synthetic sponge-type materials having water retention characteristics close to those of cellulose were obtained by this technique, the clay coating is only temporary and it soon disappears after a few rinses.

While not previously applied to hydrophobic foams to improve wiping properties, various methods are known to facilitate the slow diffusion of volatile or soluble substances, such as perfumes or medicines, from other types of articles such as a lozenge, granule, wrist watch, ear ring, plaque or strip. These involve the formation of absorbent hydrophilic inclusions in a hydrophobic support. This has been accomplished by polymerization in situ of monomers which on polymerization produce an absorbent material in the hydrophobic substrate. This method is described in the French Patent No. 2 250 793 (published June 6, 1975) and its addition certificate No. 2 348 238 (published November 10, 1977) which describes a process in which monomer (polymerizable to an absorbent reticulum) is polymerized on a hydrophobic substrate and the polymerization is controlled by ionic or ultrasonic radiation, or by immersion of the hydrophobic substrate into a solution containing the monomers, to produce hydrophilic inclusions in the hydrophobic substrate. No disclosure is made in these references of making articles having the required sponge-type properties of a wiping article and the disclosed articles appear to have a rigid structure rather than that of a flexible sponge.

The application to sponge-type articles of the aforementioned disclosed technique does not readily provide the present invention since these references fail to appreciate the physical property requirements that are needed to produce a commercially useful sponge-type article having excellent wiping properties. On the contrary, a systematic study reveals important differences from one material to the other, and an absence of any relationship between the capacity to retain water by capillary action of the same treated and untreated supports, and their structural characteristics, such as cell diameter, air-permeability and specific surface. Thus, surprisingly the same absorbency treatment does not result in a comparable improvement in the water retention characteristics of hydrophobic open celled foams having different physical structures.

SUMMARY OF THE INVENTION

The present invention provides synthetic sponge-type products for household and industrial applications having excellent water retention qualities similar to that of a cellulose sponge and physical, mechanical and chemical resistance that is at least equal to those of a cellulose sponge.

The articles of the invention comprise a body made of hydrophobic synthetic partially open-celled foam wherein the cell walls of the foam are at least partially covered by a layer of a hydrophilic absorbent material. The body of the hydrophobic foam material has a specific surface of at least about 40 $cm^2/cm^3$ and at least about 25% of its internal and external surface has a surface energy of at least about $73 \times 10^{-7}$ Newton/meter.

Preferably, the average cell diameter of the foam body is less than about 0.7 mm and the specific surface of the foam body is between 40 and 70 $cm^2/cm^3$, most preferable between 50 and 70 $cm^2/cm^3$.

The articles of the invention are permeable, preferably having a dry air-permeability corresponding to an overpressure of at least about 100 pascals (most preferably at least about 125 pascals) for a 2 cm sample thickness. The water absorption properties of the articles of the invention are preferably sufficient to provide water absorption by capillary action at normal room temperature of at least about 2 grams of water per 1 $cm^2$ of cross-section area for a 2 cm sample thickness after a 15 second immersion.

Preferred articles in according with the invention have a hydrophobic foam body made of polyurethane type foam covered by a hydrophilic polymer which preferably has been polymerized in situ onto the surface of the cells of the hydrophobic foam.

DETAILED DESCRIPTION

The articles having aforementioned physical properties have been found to have use in commercial and household applications as sponge-type articles with superior water retention properties. Characterization of the physical properties of useful products is thus an important aspect of the present invention and it was only after much research and development that the following tests and performance criteria were developed.

WATER RETENTION CAPACITY BY CAPILLARY ACTION

The quantity of water absorbed in 15 seconds by a test sample having an approximate size of 75 mm × 100 mm × 20 mm is measured. The test sample is first rinsed with water to remove trapped air, and then spinned twice to remove excess water, prior to measuring. Measuring is accomplished by immersing one 75 mm × 20 mm end of the sample about 6 mm into water (55 cc of water in a standard beaker of size 1 liter) at normal room temperature. After 15 seconds, the test sample is removed, and the absorbed quantity of water is determined by weighing the beaker to determine weight loss resulting from absorption by the test sample. Then, the same procedure is repeated for the other sample end and the average of the two measurements is determined. This average is recalculated for a test sample having a 15 cm² cross-section. This value is then expressed in g/15 cm².

SPECIFIC SURFACE

The wettability of a material depends on its surface energy, the surface tension of the liquid with which it is in contact, and the effective surface in contact with the liquid. Therefore, the surface wetted by the liquid can be determined from the measurement of its liquid retention capacity. If a liquid having a surface tension less than that of the material surface energy is used, the total specific surface of tested material can be calculated. Thus, for sponges with a polyurethane support having a surface tension of about $30 \times 10^{31}$ $^7$Newton/meter, the retention capacity in 99% ethanol (surface tension is $23 \times 10^{31}$ $^7$; Newton/meter) can be measured. On the contrary, the liquid retention capacity in distilled water is measured to calculate specific surface of the same sponge wettable with water, i.e. sponge whose surface energy is at least equal to the surface tension of water ($73 \times 10^{-7}$ Newton/meter). The specific surface expressed in cm²/cm³ is then calculated by the formula:

$$\text{Specific Surface} = \frac{(p - 9.55) \times 65.4}{y}$$

in which
p=liquid weight absorbed by capillary action.
Y=liquid surface tension
9.55 is a correction factor of the test sample immersed part
65.4 is the ratio of the gravity (g=981 cm/s²) to the test sample cross-section (15 cm²).

The difference of obtained values for water and ethanol corresponds to the percent of surface of the base hydrophobic foam material which has been treated with the absorbent polymer.

Average Cell Diameter

Determination of the average cell size permits the characterization of the physical structure of a foam to identify its relationship with the product performance as a sponge-type material. The measurement is made by drawing a straight 50 mm line on a dry foam material, and the cells touched by the line are counted to arrive at a number (N). Such measurement is preferably accomplished with the aid of a magnifier to avoid the confusion between the cells themselves and the apertures or "windows" of the cells which can be counted as cells.

Average cell diameter expressed in mm is calculated by the formula:

$$\text{Average Diameter} = \frac{50}{N}$$

Air Permeability

Resistance to a controlled air flow through the foam material is calculated by the measurement of the air overpressure which is established up-stream of a test sample surface.

This measurement allows calculating, at the level of the internal structure and in a comparative manner, the degree of openness of the cells of the foam. This method derived from French specification AFNOR NFT 56 127 to determine the behavior of cellular material vis-a-vis the air flow.

Measurement is made by placing a dry 20 mm thick test sample on an open celled honeycomb support and then placing on the top surface of the test sample a 50 mm diameter diffuser of a weight of 1,050 g. Dry compressed air is then passed through the test sample at a flow rate of about 113 liter/minute. The overpressure in the diffuser is measured in millimeter of water by use of a U-shaped water level meter. The test sample is then inverted and the test repeated. The average of the two measurements is calculated and the average expressed in pascal is retained as value of the air-permeability of foam material.

Preferred articles according to the present invention include a polyurethane open-celled foam covered by a hydrophilic acrylate type polymer, the latter being polymerized in situ. Examples of useful hydrophilic acrylate type polymers include polyethylene glycol diacrylate, diethylene glycol diacrylate, tetraethylene glycol diacrylate, polyethylene glycol dimethacrylate, diethylene glycol methacrylate, triethylene glycol dimethacrylate and tetraethylene glycol dimethacrylate. These polymers may be produced from their monomers under known polymerization conditions. Other hydrophobic materials which may be useful to make the hydrophobic foam substrate include polyvinyl chloride, polyacrylonitrile and polyester.

In an embodiment particularly advantageous, sponge-type article made in accordance with this invention is characterized by the fact that its body is made of polyurethane type foam having partially open cells, a specific surface between about 40 cm²/cm³ and 70 cm²/cm³, with cells having an average diameter less than about 0.7 mm, a dry air-permeability corresponding to an overpressure of at least about 125 pascal for a thickness of 2 cm, with at least 25% of the internal surface being covered by a polyacrylate type coating having a surface energy at least equal to $73 \times 10^{-7}$; Newton/meter, and the article has a water retention capacity by capillary action at normal room temperature, in 15 seconds, at least equal to 2 g/cm² of external surface for a thickness of about 2 cm.

Examples

This invention will be better understood by reference to the specific description of the following examples.

EXAMPLES 1-6

In a conventional way, a partially open celled polyurethane foam is prepared by addition of 2,4 and 2,6 (80/20) toluene diisocyanate or methylene diparaphenylene isocyanate to a polyol in presence of water or other suitable solvent (e.g., Freon halogenated hydrocarbon liquid) as a blowing or foaming agent, with usual additives and in the presence of catalytic agents such as stannous octoate and triethylene diamine. The degree of openness and the cell size of the foam are regulated by addition of surface-active agents to produce a hydrophobic polyurethane sponge-type substrate having the required physical characteristics for this invention.

The degree of openness and the size of the cells are regulated, among other things, by the addition of a surface active agent (preferably silicone) which allows obtaining empirically a sponge-type hydrophobic substrate of polyurethane having the characteristics required for the implementation of the invention.

One example of the chemical formulation of the polyurethane is as follows:

| Mixture A | |
| --- | --- |
| Polyol (Desmophen 3600) | 75 parts |
| Polyol (Desmophen 3900) | 25 parts |
| Water | 3 parts |
| Triethylene diamine (DABCO) | 0.5 part |
| Stannous octoate (T9) | 0.5 part |
| Silicone Polyurax (SC120) | 1 part |
| Total | 105 parts |

Desmophen is a registered trademark of the Bayer Company, DABCO and T9 are registered trademarks of the Air Products Company, Polyurax is a registered trademark of the BP Company.

Around 45 parts of toluene diisocyanate 80/20 are added to 100 parts in weight of mixture A and the two parts are mixed rapidly and thoroughly for around five seconds.

A flexible, partially open celled foam material results after about 10 to 24 hours of polymerization.

Then an absorbency treatment is performed on this substrate in accordance with technique described in the French patent No. 2 250 793 by impregnating it with a monomer capable of being polymerized to a hydrophilic polymer such as acrylic acid with a crosslinking agent such as tetraethylene glycol diacrylate, oxygenated water (for the initiating couple oxide-reducer $H_2O_2$, salts of Iron II), and distilled water. The excess of reactive agents are eliminated by spinning or squeezing, then the wiped substrate is impregnated with a solution of Iron II to initiate the polymerization reaction. When this reaction is over, the by-products and any residues of the reaction are eliminated, then the substrate is rinsed with water, spinned or squeezed and dried to obtain a sponge-type article in accordance with this invention.

Consequently, polyurethane sponges are made and have various characteristics with which water capillarity is measured before and after absorbency treatment. Obtained results are gathered in the following table:

| Polyurethane sponge Sample No. | Cells diameter (mm) | Specific surface ($cm^2/cm^3$) | Absorbent treatment (% treated surf.) | Air permeability (pascal) | Water capilarity (g/15 $cm^2$) |
| --- | --- | --- | --- | --- | --- |
| 1 | 0.79 | 27.7 | 0 | 270 | 1.5 |
|   |      |      | 41.4 | 186 | 22.3 |
| 2 | 0.57 | 39.4 | 0 | 49 | 1.4 |
|   |      |      | 33.0 | 29 | 24.1 |
| 3 | 0.51 | 47.7 | 0 | 383 | 2.2 |
|   |      |      | 41.5 | 147 | 31.6 |
| 4 | 0.52 | 79.0 | 0 | 764 | 1.1 |
|   |      |      | 27.0 | 300 | 33.3 |
| 5 | 0.60 | 49.0 | 0 | 3116 | 1.0 |
|   |      |      | 44.5 | 795 | 33.8 |
| 6 | 0.36 | 60.3 | 0 | 1049 | 1.3 |
|   |      |      | 41.0 | 147 | 37.1 |

Only Examples 3 to 6 satisfy the physical requirements to produce the invention because they have a water capillarity in excess of 30 g/15 $cm^2$. Examples 1 and 2 are comparative examples.

Structural criteria required for this invention are those corresponding to specific surface values greater than 40, of which at least about 25% show result of absorbency treatment, preferably with cell diameter less than 0.7 mm and an air-permeability greater than 100.

The comparison of criteria values measured on the examples show that there is a surprising lack of determining relation between obtained capillarity and ratio of surface retaining the absorbency treatment, as well as cell diameters, specific surface, and air-permeability, also between these various criteria, outside of the combination of the values range established by this invention. Also, it is noted that there is an unforeseable absence of significant relation between measured capillarity before and after treatment.

Sponge-type articles made in accordance with this invention, have an excellent resistance against household cleaning products which they can handle during normal use, particularly hot water at 70° C, detergents having ammonium or not. Practically, they keep their water retention and wiping quality until normal worn out of their hydrophobic initially absorbent post-treated support.

We claim:

1. Synthetic sponge-type articles having excellent water retention properties, comprising a flexible, partially open celled foam body made of hydrophobic synthetic material, at least partially covering the cell walls of said foam body with a layer of hydrophilic absorbent material, wherein the foam body has a specific surface at least equal to about 40 $cm^2/cm^3$, and at least about 25% of its internal and external surface has an energy surface at least equal to about 73 x 10−7 Newton/meter.

2. The article in accordance with claim 1 wherein average diameter of the cells of said body are less than about 0.7 mm.

3. The article in accordance with claim 1 wherein the specific surface of the body is between 50 and 70 $cm^2/cm^3$.

4. The article in accordance with claim 1 wherein said foam body has a dry air-permeability corresponding to an overpressure of at least equal to about 100 pascals for a sample thickness of about 2 cm.

5. The articles in accordance with claim 1 having a water absorption by capillary action at normal room temperature of at least about 2 grams of water per 1 cm$^2$ of cross-section for a thickness of about 2 cm, for 15 seconds.

6. The articles in accordance with claim 1 wherein said hydrophobic material is polyurethane and said hydrophilic material layer is a surface-active polymer of the acrylate type polymerized in situ.

* * * * *

UNITED STATES PATENT AND TRADEMARK OFFICE
CERTIFICATE OF CORRECTION

PATENT NO. : 4,957,810

DATED : September 18, 1990

INVENTOR(S) : ELEOUET ET AL.

It is certified that error appears in the above-identified patent and that said Letters Patent is hereby corrected as shown below:

On the cover page under [75] Inventors:, "all of St. Paul, Minn" should read --all of France--.

Col. 3, line 7, "spinned" should read --spun--.

Col. 3, line 33, "30x10$^{31}$ $^7$" should read --30x10$^{-7}$--.

Col. 3, line 35, "23x10$^{31}$ $^7$;" should read --23x10$^{-7}$".

Col. 5, line 68, "spinned" should read --spun--.

Col. 6, lines 46-49, delete "Practically, they keep their water retention and wiping quality until normal worn out of their hydrophobic initially absorbent post-treated support." and insert in its place --Practically, the sponge-type articles of the invention keep their water retention and wiping qualities until they are exhausted in use and then the sponge-type article returns to its post-treated hydrophobic condition--.

Signed and Sealed this

Nineteenth Day of October, 1993

*Attest:*

BRUCE LEHMAN

*Attesting Officer*     *Commissioner of Patents and Trademarks*